US010013950B2

(12) United States Patent
Hundal et al.

(10) Patent No.: US 10,013,950 B2
(45) Date of Patent: *Jul. 3, 2018

(54) SYSTEMS AND METHODS FOR TRANSMITTING VIDEO, NETWORK, AND USB SIGNALS OVER EXTENSION MEDIA

(71) Applicant: Icron Technologies Corporation, Burnaby (CA)

(72) Inventors: Sukhdeep Singh Hundal, Surrey (CA); Terence Carl Sosniak, Aldergrove (CA); David Patrick Frey, Burnaby (CA)

(73) Assignee: Icron Technologies Corporation, Burnaby (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/714,898

(22) Filed: Sep. 25, 2017

(65) Prior Publication Data
US 2018/0012559 A1     Jan. 11, 2018

Related U.S. Application Data

(63) Continuation of application No. 14/927,336, filed on Oct. 29, 2015, now Pat. No. 9,799,302.
(Continued)

(51) Int. Cl.
*G06F 13/14* (2006.01)
*G09G 5/00* (2006.01)
(Continued)

(52) U.S. Cl.
CPC .......... *G09G 5/006* (2013.01); *G06F 13/385* (2013.01); *G06F 13/4081* (2013.01);
(Continued)

(58) Field of Classification Search
CPC .......... G06F 3/14; G09G 5/363; G09G 5/006; G09G 5/001; G06T 1/20
(Continued)

(56) References Cited

U.S. PATENT DOCUMENTS 6,381,666 B1    4/2002   Kejser et al.
7,587,536 B2    9/2009   McLeod
(Continued)

OTHER PUBLICATIONS

"DisplayPort v1.3: Feature Summary," PowerPoint presentation, Sep. 18, 2014, VESA, <http://www.displayport.org/wp-content/uploads/2014/09/DP-1.3-Overview-for-VESA-v1.pdf>, [retrieved Dec. 31, 2015], 14 pages.
(Continued)

*Primary Examiner* — Ke Xiao
*Assistant Examiner* — Gordon Liu
(74) *Attorney, Agent, or Firm* — Christensen O'Connor Johnson Kindness PLLC

(57) ABSTRACT

In some embodiments, systems, devices, and methods are provided that allow a host device to communicate video information, network information, and USB information over USB via a USB host controller. The video information and the network information are encapsulated within USB and communicated by the USB host controller.

In some embodiments, the USB information communicated by the USB host controller is further communicated over a non-USB extension medium by an upstream facing port device and one or more downstream facing port devices.

18 Claims, 10 Drawing Sheets

Related U.S. Application Data

(60) Provisional application No. 62/072,328, filed on Oct. 29, 2014.

(51) Int. Cl.
  *G06F 13/38* (2006.01)
  *G06F 13/42* (2006.01)
  *G06F 13/40* (2006.01)

(52) U.S. Cl.
  CPC ..... *G06F 13/4247* (2013.01); *G09G 2370/10* (2013.01); *G09G 2370/12* (2013.01); *G09G 2370/14* (2013.01)

(58) Field of Classification Search
  USPC .......................................................... 345/520
  See application file for complete search history.

(56) References Cited

U.S. PATENT DOCUMENTS

| | | | | |
|---|---|---|---|---|
| 8,407,367 | B2* | 3/2013 | Chandra | G06F 13/387 709/230 |
| 8,549,197 | B2* | 10/2013 | Hall | H04L 5/1415 710/105 |
| 8,782,321 | B2* | 7/2014 | Harriman | G06F 13/4022 710/316 |
| 9,047,418 | B2 | 6/2015 | Hall | |
| 9,053,246 | B2* | 6/2015 | Moore | G06F 13/362 |
| 2004/0177197 | A1* | 9/2004 | McLeod | G06F 13/4045 710/300 |
| 2014/0177185 | A1 | 6/2014 | Poffenberger | |
| 2014/0181325 | A1 | 6/2014 | Hundal et al. | |

OTHER PUBLICATIONS

"Universal Serial Bus 3.1 Specification," Revision 1.0, Jul. 26, 2013, Hewlett-Packard Company, Intel Corporation, Microsoft Corporation, Renesas Corporation, ST-Ericsson, and Texas Instruments, 631 pages.

"Universal Serial Bus Power Delivery Specification," Revision 2.0, V1.1, May 7, 2015, Hewlett-Packard Company, Intel Corporation, LSI Corporation, Microsoft Corporation, Renesas, ST-Microelectronics, and Texas Instruments, 544 pages.

"Universal Serial Bus Specification," Revision 2.0, Apr. 27, 2000, Compaq Computer Corporation, Hewlett-Packard Company, Intel Corporation, Lucent Technologies Inc, Microsoft Corporation, NEC Corporation, and Koninklijke Philips Electronics N.V., 650 pages.

"Universal Serial Bus Type-C Cable and Connector Specification," Revision 1.1, Apr. 3, 2015, USB 3.0 Promoter Group, 180 pages.

"VESA DisplayPort Alt Mode for USB Type-C Standard: Feature Summary," PowerPoint presentation, Sep. 22, 2014, VESA, <http://www.displayport.org/wp-content/uploads/2014/09/DP-Alt-Mode-Overview-for-VESA-v1.pdf>, [retrieved Dec. 31, 2015], 17 pages.

\* cited by examiner

SYSTEMS AND METHODS FOR TRANSMITTING VIDEO, NETWORK, AND USB SIGNALS OVER EXTENSION MEDIA

CROSS-REFERENCES TO RELATED APPLICATIONS

This application is a continuation of U.S. application Ser. No. 14/927,336, filed Oct. 29, 2015, which claims the benefit of U.S. Provisional Application No. 62/072328, filed Oct. 29, 2014, each expressly incorporated herein by reference in its entirety.

BACKGROUND

USB is a peripheral interface for attaching a wide variety of computing devices, such as personal computers, digital telephone lines, monitors, modems, mice, printers, scanners, game controllers, keyboards, storage devices, and/or the like. The specifications defining USB (e.g., Intel et al., Universal Serial Bus Specification, Revision 1.0, January 1996; updated as Revision 1.1 in September 1998; further updated as Revision 2.0 in April 2000; further updated as Revision 3.0 in November 2008; and further updated as "Universal Serial Bus 3.1 Specification, Revision 1.0" on Jul. 26, 2013, by Hewlett-Packard Company et al., and subsequent updates and modifications—hereinafter collectively referred to as the "USB Specifications," which term can include future modifications and revisions) are non-proprietary and are managed by an open industry organization known as the USB Forum. The USB Specifications establish basic criteria that must be met in order for communication to comply with USB standards, and are incorporated herein in their entireties for all purposes. One of ordinary skill in the art will recognize many terms herein from the USB Specifications. Those terms are used herein in a similar manner to their use in the USB Specifications, unless otherwise stated.

Standards have been published that describe a universal serial bus (USB) Type-C connector, plug, and cable that can support communication via USB 2.0, SuperSpeed, and DisplayPort via the same connector, including concurrent communication of at least some of these signals. USB Type-C connectors, plugs, and cables are described in detail at least in "Universal Serial Bus Type-C Cable and Connector Specification, Revision 1.1," released on Apr. 3, 2015, by USB 3.0 Promoter Group. Power delivery over USB and the negotiation thereof is described in detail at least in "Universal Serial Bus Power Delivery Specification, Revision 2.0, Version 1.1," released on May 7, 2015, by Hewlett-Packard Company et al. DisplayPort communication is described in detail at least in "VESA DisplayPort Standard, Version 1.3," released on Sep. 15, 2015, by VESA. Communication of DisplayPort information over a USB Type-C interface is described in detail at least in the VESA DisplayPort Alt Mode Standard, Version 1, released on Sep. 22, 2014, by VESA. Each of these documents and their contents are known to one of ordinary skill in the art, and are hereby incorporated by reference herein along with any earlier versions or related documents mentioned therein in their entireties for all purposes.

Traditionally, USB communication, video information, and network communication have all been conducted by a host device over separate media. Each such medium is constrained by the various requirements imposed by standards. What is needed are devices and techniques that enable a host device to exchange USB communication, video information, and network communication over a common communication technique, and to be able to extend the common communication technique to be communicable over topologies and distances not supported by the associated defining standard.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a system for communication of at least USB information and video information via an extension medium is provided. The system comprises a host computing device, an upstream facing port device (UFP device), and a downstream facing port device (DFP device). The UFP device is configured to be coupled to the host computing device via USB. The DFP device is configured to be coupled to the UFP device via an extension medium. The DFP device includes a video device emulation engine configured to receive USB information and extract video information encapsulated therein; and a video source emulation engine configured to receive the extracted video information and to transmit an output video signal to a video sink.

In some embodiments, an upstream facing port device (UFP device) is provided. The UFP device comprises a USB upstream facing port, a USB function, a network interface, and a repeater/forwarder engine. The repeater/forwarder engine is configured to receive a USB packet via the USB upstream facing port; in response to determining that the USB packet includes a route string that indicates that the USB packet is intended for the USB function, provide the USB packet to the USB function; and in response to determining that the USB packet includes a route string that indicates that the USB packet is intended for a remote USB function accessible via a downstream facing port device (DFP device), transmit the USB packet to the DFP device via the network interface.

In some embodiments, a method is provided. A UFP device receives, from a host, a USB packet via a USB upstream facing port. The UFP device determines a destination for information carried by the USB packet based on a route string in the USB packet. The UFP device provides the USB packet to a local USB function in response to determining that the route string is a first route string associated with the local USB function. The UFP device provides the USB packet to a downstream facing port device (DFP device) via a network interface in response to determining that the route string is a second route string that is different from the first route string and is associated with a remote USB function provided by the DFP device.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
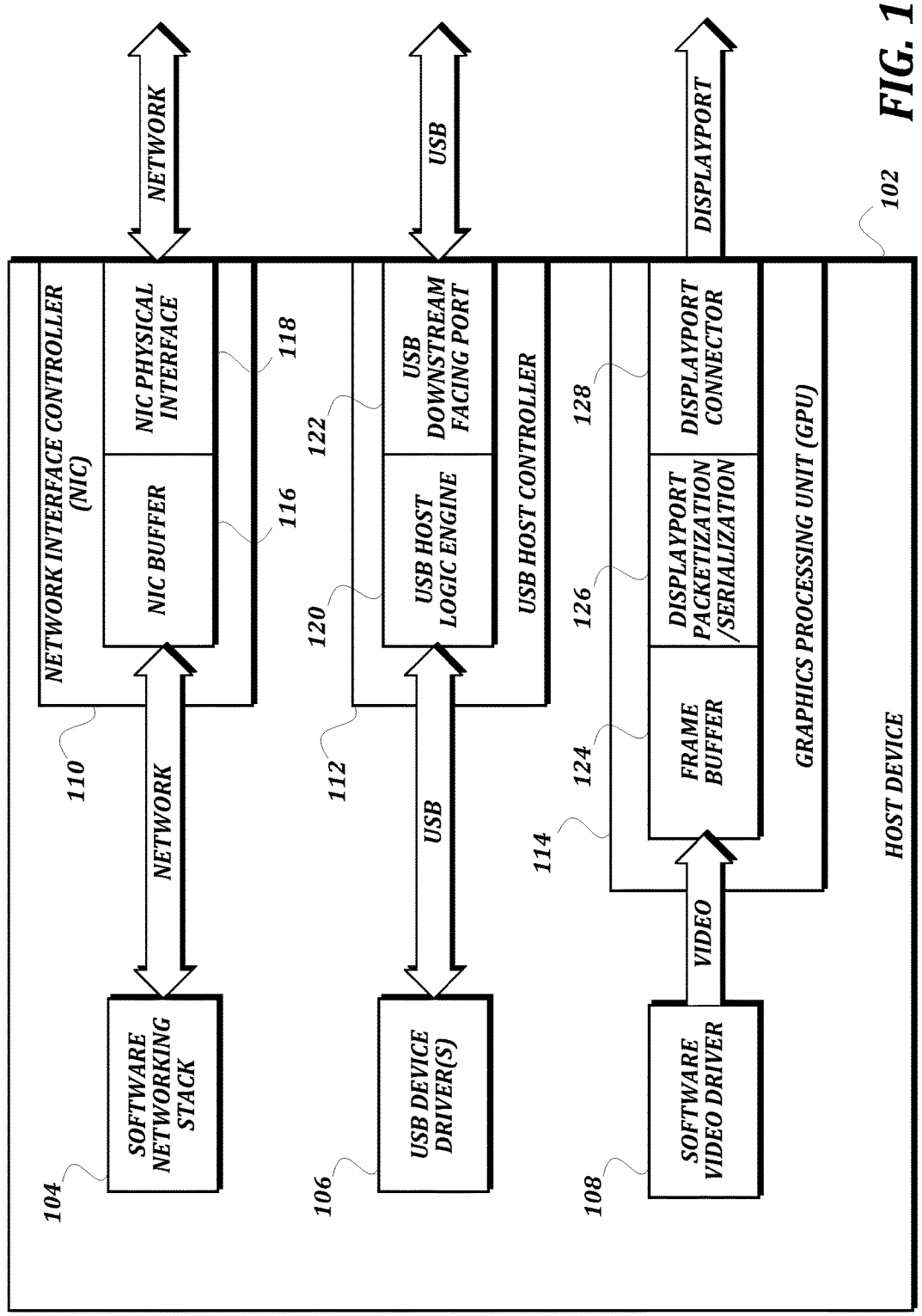
FIG. 1 is a block diagram that illustrates typical communication by a conventional host device.

FIG. 1 is a block diagram that illustrates typical communication by a conventional host device. Software on the host device 102 communicates with USB devices using one or more USB device drivers 106. The USB device drivers 106 expose functionality of the USB devices to the software, and manage communication between the software and a USB host controller 112. Within the USB host controller 112, a USB host logic engine 120 controls the topology of USB devices connected to the USB downstream facing port 122 as described in the USB Specifications, including managing connectivity, USB device addressing, and the like. The USB host logic engine 120 receives USB information intended for connected USB devices from the USB device drivers 106, and transmits the USB information for delivery to the connected USB devices via the USB downstream facing port 122. Likewise, the USB host logic engine 120 receives USB information from the connected USB devices intended for software on the host device 102, and provides the USB information to the software via the USB device drivers 106.

In some embodiments, the USB information is communicated using SuperSpeed techniques as described in the USB 3.0 Specification and/or the USB 3.1 Specification. In some embodiments, a different USB communication technique, including techniques disclosed in the USB 2.0 Specification, the USB 1.1 Specification, or an earlier- or later-released USB specification may be used instead of or in addition to SuperSpeed techniques. In some embodiments, the USB downstream facing port 222 may be a USB 3.0 or 3.1-compatible receptacle, a USB Type-C receptacle, or any other suitable receptacle or captive cable compatible with the USB communication techniques mentioned herein. Further details of typical communication and functionality of the USB host controller 112 are known to those of ordinary skill in the art, and so are not discussed in further detail herein for the sake of brevity.

Software on the host device 102 may also communicate with network devices on a non-USB network using a software networking stack 104 and a network interface controller (NIC) 110. The NIC 110 may be any suitable controller for providing connectivity to a non-USB communication network. In some embodiments, the non-USB communication network may include an Ethernet network. In some embodiments, the NIC 110 may provide access to any other type of communication network, including but not limited to a Token Ring network, a Bluetooth network, an LTE network, a point-to-point connection, and/or the like. The non-USB communication network may be wired or wireless. In some embodiments, the NIC 110 may be integrated into a motherboard or other system device of the host device 102. In some embodiments, the NIC 110 may be an add-on device such as an expansion card and/or the like.

As illustrated, the NIC 110 receives network information that is generated by a software networking stack 104 and that is addressed to a destination device on the non-USB network. In some embodiments, the software networking stack 104 creates the network information and provides it to the NIC 110, where it is stored in a NIC buffer 116. The NIC buffer 116 is a computer-readable medium associated with the NIC 110 for the temporary storage of inbound and/or outbound network information. The NIC 110 transfers the network information from the NIC buffer 116 to the non-USB network via a NIC physical interface 118. In some embodiments, once the network information is generated and transferred to the non-USB network via the NIC physical interface 118, the components of the non-USB network (such as switches, routers, and/or the like) are able to convey the network information to the destination device on the non-USB network using the destination address in the network information. The NIC 110 is also configured to receive network information from the non-USB network that is addressed to software on the host device 102, in which case the techniques described above would be performed in reverse: the network information would be received via the NIC physical interface 118, stored in the NIC buffer 116, and then provided form the NIC buffer 116 to the software via the software networking stack 104. Because these are traditional techniques for transmitting and receiving non-USB network information, they are familiar to one of ordinary skill in the art and so are not described in further detail herein for the sake of brevity.

Software on the host device 102 may also generate graphics for display using a software video driver 108 and a graphics processing unit (GPU) 114. In some embodiments, the GPU 114 is any suitable device for generating a video signal representing video information generated by the host device 102. In some embodiments, the GPU 114 may be an integrated graphics adapter. In some embodiments, the GPU 114 may be provided by an expansion card, an external device, or by any other suitable technology. As illustrated, the GPU 114 receives video information, which commonly represents graphics to be presented on a display, from a software video driver 108. The video information is stored in a frame buffer 124. In some embodiments, video information may be generated by the software video driver 108 and stored directly in the frame buffer 124 for display. In some embodiments, the software video driver 108 may cause one or more processors (such as shaders, video decoders, and/or the like, which are not illustrated) of the GPU 114 to generate the video information to be stored in the frame buffer 124 for display.

In some embodiments, once the video information is available in the frame buffer 124, the GPU 114 generates a video signal based on the video information. The video signal may be suitable for transmission to and display by a video device. In the illustrated embodiment, a DisplayPort video signal is generated by a DisplayPort packetization/serialization engine 126, and the serialized signal is provided to a DisplayPort connector 128 for transmission to a DisplayPort sink. Details regarding techniques for the creation of a DisplayPort signal from a frame buffer 124 are known to those of ordinary skill in the art, and so are not described further here for the sake of brevity. Though the illustrated embodiment shows the creation and output of a DisplayPort video signal, any other video signal may be generated in other embodiments instead of or in addition to DisplayPort, including but not limited to a DVI signal, an HDMI signal, and a VGA signal.

In the traditional system illustrated in FIG. 1, the NIC 110, the USB host controller 112, and the GPU 114 each communicate via a separate physical interface, using separate communication techniques. Such a traditional system has many drawbacks. For example, providing separate physical interfaces for each of these devices requires additional physical space within the host device 102, making it exceedingly difficult to minimize the size of the host device 102. As another example, the number of cables required to connect the host device 102 to USB devices, a video sink, and the network quickly becomes unwieldy. As still another example, many video signal transmission techniques have a limited range, and so could benefit from extension technologies. To solve these (and other) problems, some embodiments of the present disclosure allow the network information and/or the video information to be transmitted via USB along with the USB information. In some embodiments, this combined USB information may then be extended and routed over a non-USB network in a manner that is largely transparent to the host device 102 and does not require changes to the software networking stack 104, USB device drivers 106, or software video driver 108.

Figure 2:
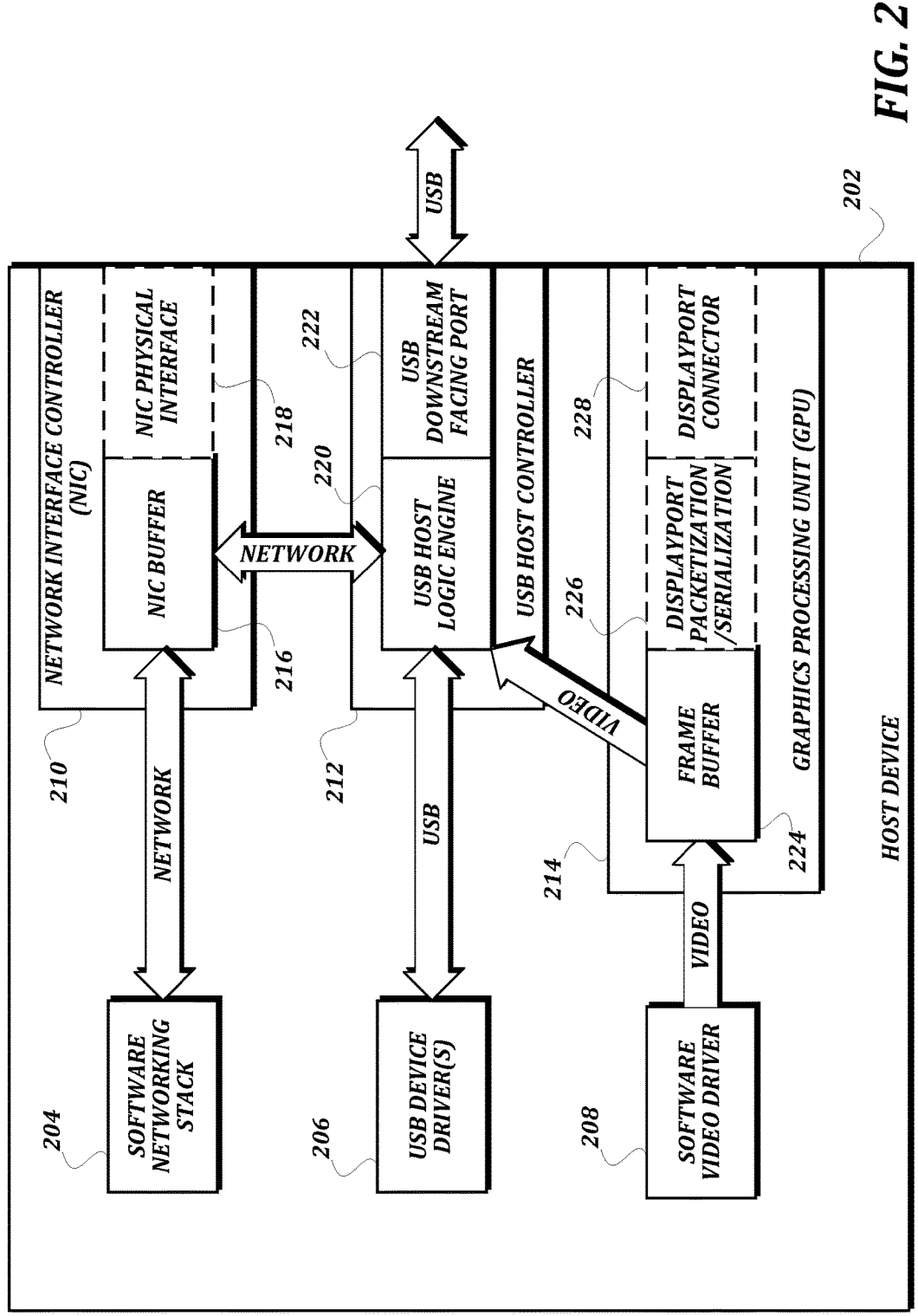
FIG. 2 illustrates an exemplary embodiment of a host device that is configured to transmit network information, video information, and USB information all via USB according to various aspects of the present disclosure.

FIG. 2 illustrates an exemplary embodiment of a host device that is configured to transmit network information, video information, and USB information all via USB according to various aspects of the present disclosure. The host device 202 includes a software networking stack 204, USB device drivers 206, and a software video driver 208 configured to communicate with the NIC 210, USB host controller 212, and GPU 214, respectively, using techniques that are similar to the techniques illustrated in FIG. 1 and discussed above. The NIC 210, USB host controller 212, and GPU 224 are also similar to those illustrated in FIG. 1, except as discussed below.

In some embodiments, once network information is received from the software networking stack 204 by the NIC 210, the NIC 210 provides the network information to the USB host controller 212 (instead of to the NIC physical interface 218, which may not be present). The network information may be temporarily stored in the NIC buffer 216, or may be transmitted directly from the NIC 210 to the USB host controller 212. The USB host controller 212 encapsulates the network information within USB information for transmission via the USB downstream facing port 222. Likewise, upon receiving network information encapsulated in USB via the USB downstream facing port 222, the USB host logic engine 220 may provide the network information to the NIC 210 (or to the software networking stack 204) instead of to a USB device driver 206. In some embodiments, the host device 202 could use DMA, bus transfers, or any other suitable technique for transferring the information between the NIC 210 and the USB host controller 212. In some embodiments, the software networking stack 204 may provide the network information directly to the USB host controller 212 instead of to the NIC 210. For example, the USB device drivers 206 may include a USB device driver that appears to provide access to a NIC, and the software networking stack 204 may transmit the network information to the USB device driver instead of to the NIC 210. The USB device driver would then provide the network information to the USB host controller 212.

Further, in some embodiments, once video information is received into the frame buffer 224, the GPU 224 provides the video information to the USB host controller 212 instead of performing further processing and/or creating a video signal for transmission to the DisplayPort connector 228. The USB host controller 212 then encapsulates the video information within USB information for transmission via the USB downstream facing port 222. In some embodiments, the DisplayPort packetization/serialization engine 226 may process the video information, and the GPU 214 may provide the serialized video information to the USB host controller 220 instead of the plain video information from the frame buffer 224. In embodiments wherein the video information is provided to the USB host controller 212 before processing by the DisplayPort packetization/serialization engine 226, the DisplayPort packetization/serialization engine 226 may be omitted. In some embodiments, the GPU 224 may provide the video information to the software networking stack 204 or to the NIC buffer 216, where the video information is then encapsulated in a network protocol before then being transferred to the USB host controller 212. In some embodiments, the GPU 214 or the software video driver 208 may provide the video information directly to the USB host controller 212 or to a USB device driver 206 without first storing it in the frame buffer 224.

As illustrated, the NIC physical interface 218 and the DisplayPort connector 228 are optional. In some embodiments, the aggregation of the video information and network information over USB is configurable by a user, and so the NIC physical interface 218 and/or the DisplayPort connector 228 may be present to allow for a configuration wherein the information is not aggregated, but is instead communicated in a traditional manner. In some embodiments wherein all communication happens over USB, the NIC physical interface 218 and/or the DisplayPort connector 228 may be omitted in order to save complexity and reduce the size of the host device 202.

Figure 3:
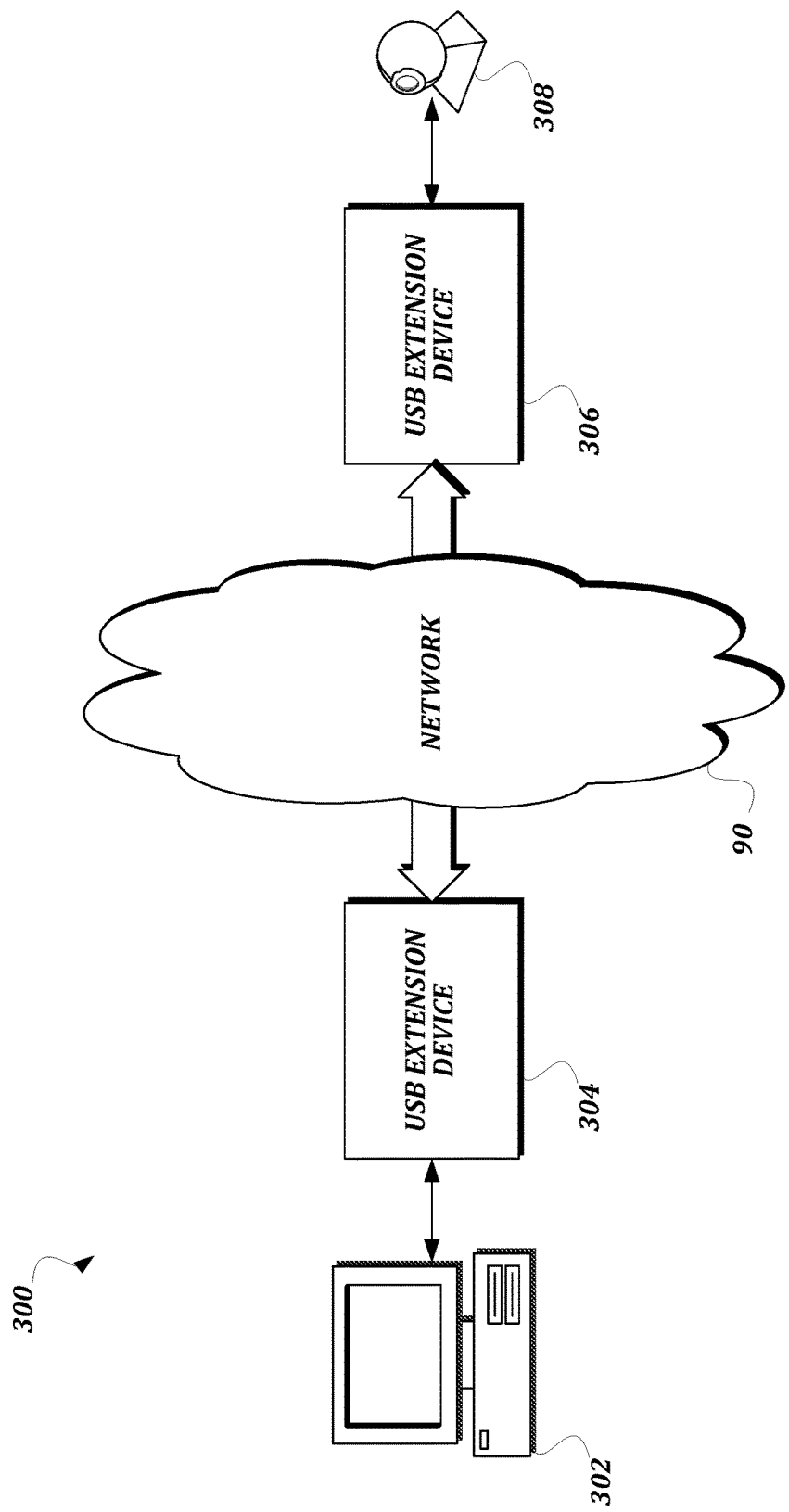
FIG. 3 is a block diagram that illustrates an exemplary embodiment of a system for exchanging USB communication (including the combined information illustrated in FIG. 2) over a non-USB extension medium according to various aspects of the present disclosure.

Once encapsulated and transmitted via the USB downstream facing port 222, the combined information may be routed and extended along with the USB information over a non-USB extension medium. FIG. 3 is a block diagram that illustrates an exemplary embodiment of a system 300 for exchanging USB communication (including the combined information described above) over a non-USB extension medium according to various aspects of the present disclosure. The system 300 includes a host device 302 and a USB device 308. Traditionally, the host device 302 and the USB device 308 would be directly connected via a USB cable, and would communicate directly with one another via a protocol that conforms to a USB specification, such as USB 1.0, USB 1.1, USB 2.0, USB 3.0, USB 3.1, or any other USB specification. Once the host device 302 and USB device 308 are separated by a non-USB communication medium, various issues may arise with regard to establishing and maintaining a USB connection between the host device 302 and the USB device 308. Further, although a single USB device 308 is illustrated, in some embodiments multiple USB devices 308 may be present in the system 300, as may be a display sink for which the video information is intended. Also, in some embodiments, the system 300 may include one or more non-USB devices on the network 90 for which the network information is intended.

The host device 302 may be any type of computing device containing a USB host controller as described above. Some examples of suitable host devices 302 may include, but are not limited to, a desktop computer, a laptop computer, a tablet computing device, a server computer, a set-top box, an audio head unit for an automobile, an embedded host, and/or the like. Likewise, the USB device 308 may be any type of device capable of communicating via a USB protocol with a USB host controller. The example illustrated in FIG. 3 is a webcam, but some other examples of suitable USB devices 308 may include, but are not limited to, a human interface device such as a keyboard or mouse, a mass storage device such as a flash drive or external hard drive, a USB-capable medical device, a printer, a USB hub, a wireless controller, and/or the like.

In the present system 300, the host device 302 is connected via a USB protocol to an upstream USB extension device 304, and the USB device 308 is connected via a USB protocol to a downstream USB extension device 306. The upstream USB extension device 304 and the downstream USB extension device 306 are communicatively coupled via a network 90 that may increase the distance between the host 302 and the USB device 308 beyond that supported by the USB specification, or otherwise be a signal transmission medium not supported by the USB specification. The network 90 and communication thereon may include any suitable networking technology, such as Ethernet, Bluetooth, WiFi, WiMax, LTE, the Internet, serial communication, and/or the like, and any suitable communication medium, such as via physical cables, via wireless spectrum, via fiber-optic cable, and/or the like. In some embodiments, the upstream USB extension device 304 and the downstream USB extension device 306 may happen to be closer to each other than the short USB requirement distance, and/or may be directly connected by a cable instead of via a network 90.

Figure 4:
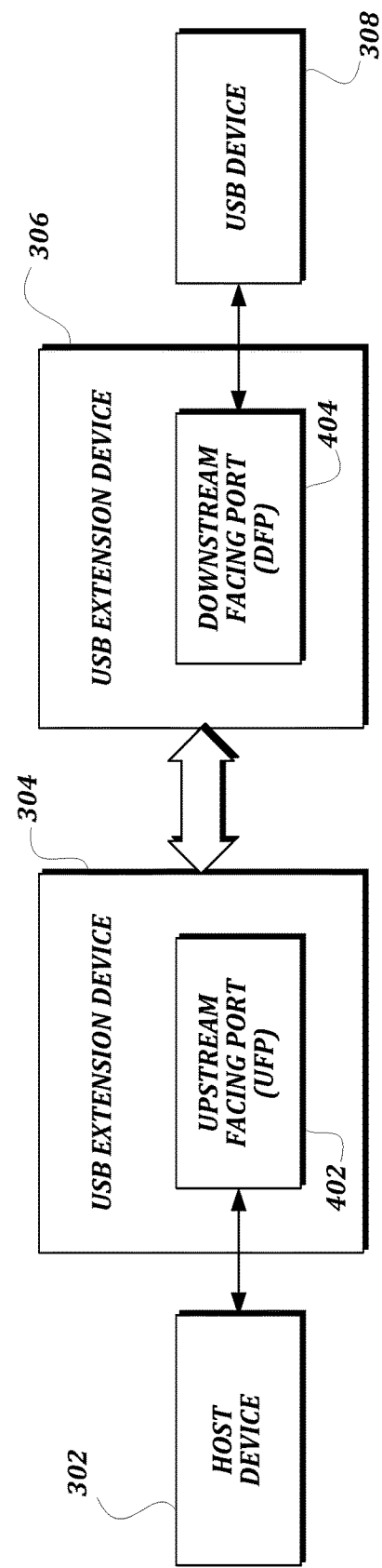
FIG. 4 is a block diagram that illustrates further details of the upstream USB extension device and downstream USB extension device illustrated in FIG. 3.

FIG. 4 is a block diagram that illustrates further details of the upstream USB extension device 304 and downstream USB extension device 306 illustrated in FIG. 3. The upstream USB extension device 304 includes an upstream facing port 402, and the downstream USB extension device 306 includes a downstream facing port 404. As used herein, the terms "upstream facing port" and the corresponding acronym "UFP" may be used interchangeably, as may the terms "downstream facing port" and the corresponding acronym "DFP." Likewise, the upstream USB extension device 304 is interchangeably described as an upstream facing port device or UFP device, and the downstream USB extension device 306 is interchangeably described as a downstream facing port device or DFP device. The UFP 402 is configured at least to communicate with the host device 302 via a USB-standard-compliant protocol, and to exchange USB bus traffic and other signals with the DFP 404 via the network 90. The DFP 404 is configured at least to communicate with the device 308 via a USB-standard-compliant protocol, and to exchange messages and USB bus traffic with the UFP 402. The upstream USB extension device 304 and the downstream USB extension device 306 may contain further components such as a power supply, a status LED, a loudspeaker, an input device for switching between UFP functionality and DFP functionality, and/or the like. Since such components and their functions are familiar to those of ordinary skill in the art, they have not been discussed further herein.

As illustrated in FIG. 4, the upstream facing port 402 of the upstream USB extension device 304 is connected to the downstream facing port of a host device 302, and the downstream facing port 404 of the downstream USB extension device 306 is connected to an upstream facing port of a USB device 308. In other embodiments, the upstream facing port 402 of the upstream USB extension device 304 may be connected to a downstream facing port other than one provided by a host device 302, such as a downstream facing port of a hub and/or the like. Likewise, in other embodiments, the downstream facing port 404 of the downstream USB extension device 306 may be connected to an upstream facing port other than one provided by a USB device 308, such as an upstream facing port of a hub and/or the like.

Techniques for exchanging USB information between the host device 302 and a downstream USB device 308 via the UFP device 304 and the DFP device 306 via the non-USB network are discussed at least in U.S. Pat. No. 9,047,418, issued on Jun. 2, 2015; U.S. Pat. No. 7,587,536, issued Sep. 8, 2009; U.S. Pat. No. 6,381,666, issued Apr. 30, 2002, the entire disclosures of which are hereby incorporated by reference herein for all purposes. Because those documents supply a full disclosure of how to transmit USB information at least between a given UFP device and a given DFP device, further details of the communication between a UFP device and a DFP device are not provided for the sake of brevity. However, these existing techniques are improved within embodiments of the present disclosure in multiple ways, including but not limited to allowing routing of information using SuperSpeed techniques, and allowing routing of encapsulated video information and/or encapsulated network information, as discussed in further detail below.

Figure 5A:
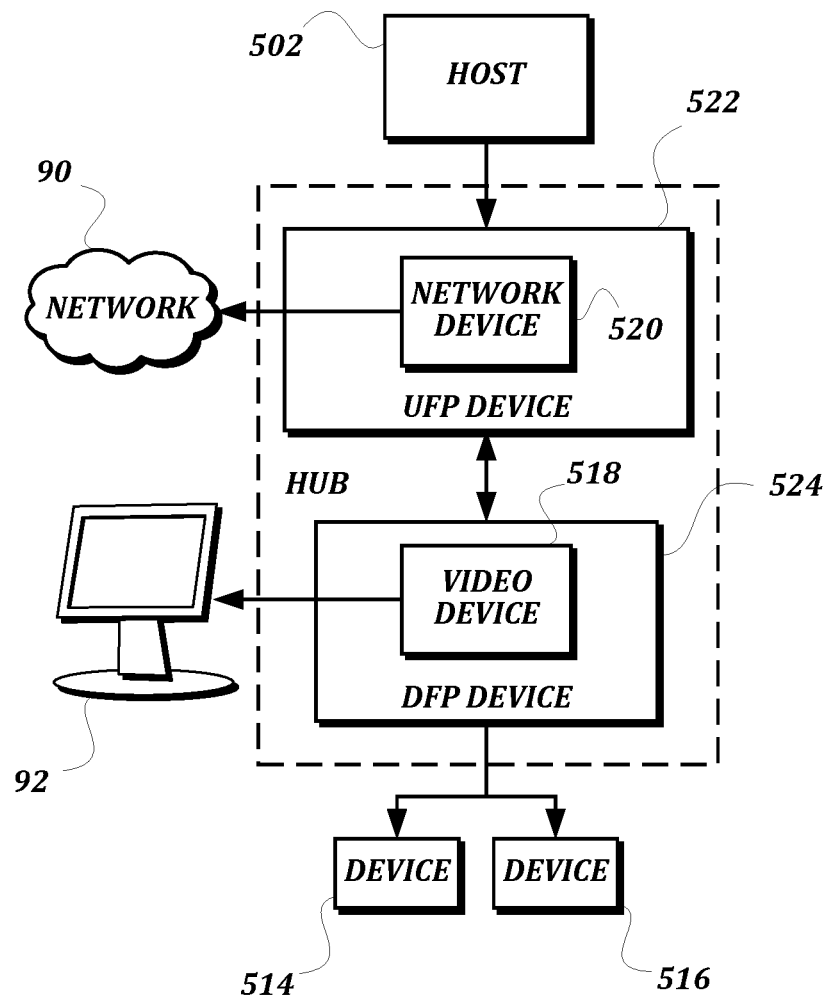
FIG. 5A is a schematic diagram that illustrates an exemplary embodiment of a system for routing and transmitting USB information, video information encapsulated in USB, and network information encapsulated in USB from a host to multiple devices via a non-USB extension medium according to various aspects of the present disclosure.

FIG. 5A is a schematic diagram that illustrates an exemplary embodiment of a system for routing and transmitting USB information, video information encapsulated in USB, and network information encapsulated in USB from a host to multiple devices via a non-USB extension medium according to various aspects of the present disclosure. The host 502 is similar to host device 202 illustrated in FIG. 2, in that it is configured to output video information encapsulated in USB and/or network information encapsulated in USB as well as other USB information. As illustrated, the UFP device 522 includes a USB function for a network device 520. As is also illustrated, the DFP device 524 includes two USB downstream facing ports to which USB devices 514, 516 are connected. The DFP device 524 also includes a USB function for a video device 518. The UFP device 522 and the DFP device 524 are connected by a non-USB extension medium, which may include portions of the network 90. Further details of the components of the UFP device 522 and the DFP device 524 are provided further below.

In some embodiments, the UFP device 522 is capable of routing USB information to appropriate endpoints. This routing may be similar to actions taken by a USB hub in routing USB information between its upstream facing port and downstream facing ports. In some embodiments, UFP device 522 may appear to the host 502 as a USB hub that has downstream facing ports for each USB function provided by the UFP device 522 and also for each USB function provided by the DFP device 524 (including the connected USB devices 514, 516). However, there are important distinctions between the functionality of the UFP device 522 and the functionality of a standard USB hub. For example, in some embodiments, the UFP device 522 is not just capable of routing incoming USB information from an upstream facing port to a downstream facing port on the same device (as is a USB hub), but instead is also capable of routing incoming USB information across the non-USB extension medium to the DFP device 524. As another example, in some embodiments, the UFP device 522 is capable of routing incoming USB packets to the network device 520 and/or the video device 518 based on a type of content encapsulated within the incoming USB packets.

Once USB information is output by the host 502, it is received by the UFP device 522. For each incoming USB packet or other message, the UFP device 522 determines a destination based on a content of the packet. If the UFP device 522 determines that the packet encapsulates network information or is otherwise destined for the network device 520, the UFP device 522 provides the USB packet to the network device 520, which then provides the network information to the network 90 for transmission. If the UFP device 522 determines that the USB packet encapsulates video information or is otherwise destined for the video device 518, the UFP device 522 transmits the USB packet to the video device 518 of the DFP device 524 via the non-USB extension medium. This transmission is performed similar to other USB-over-extension-medium communication as described in the patents incorporated above. The video device 518 then generates a video signal based on the video information and provides it to a display 92. Otherwise, if the UFP device 522 determines that the USB packet is normal USB traffic that does not encapsulate video information or network information and is instead intended for USB devices such as device 514 or device 516, then the UFP device 522 transmits it to the DFP device 524 using the techniques described in the incorporated patents. More details regarding how destinations are determined for given USB packets are provided below.

Figure 5B:
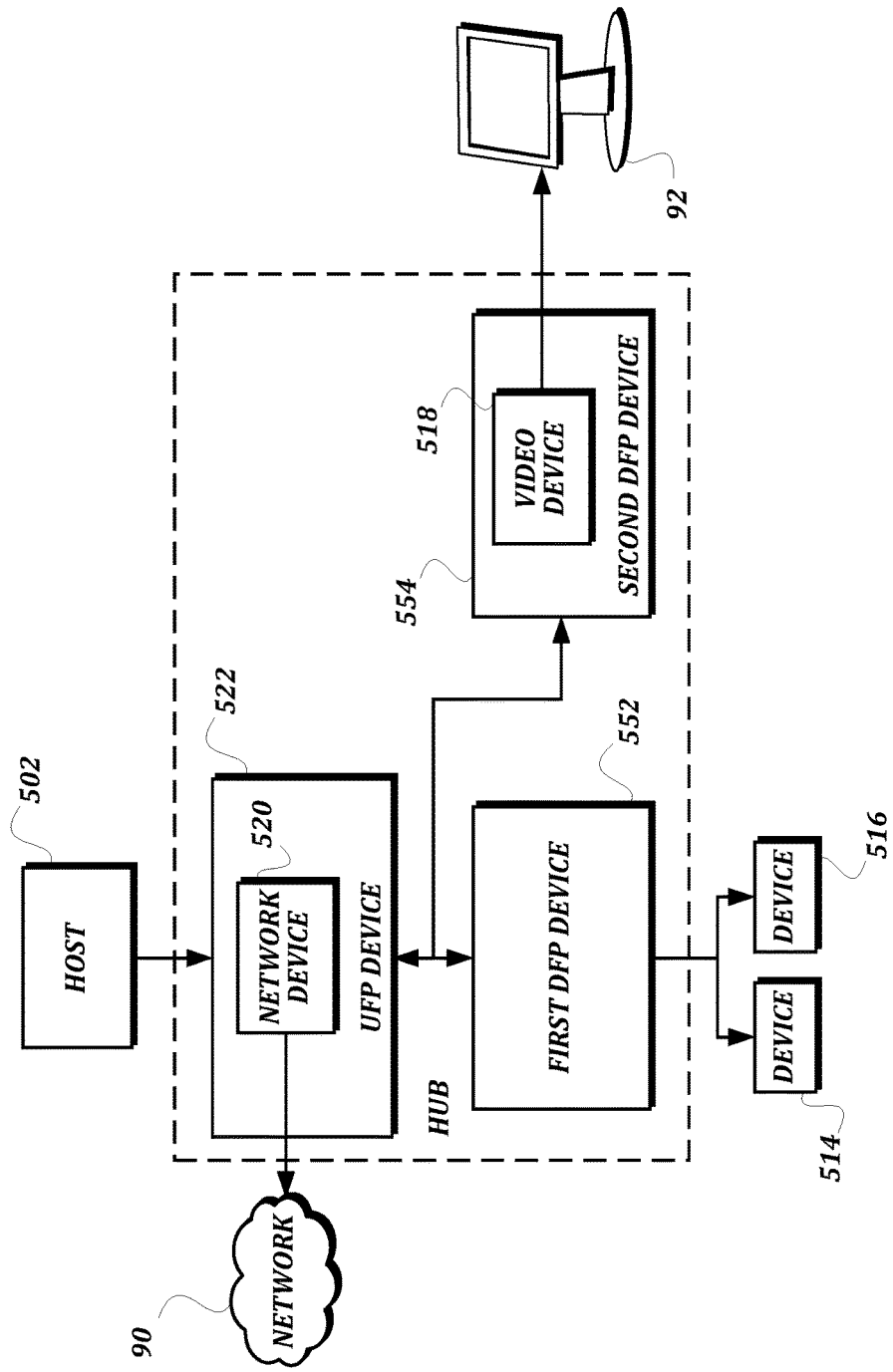
FIG. 5B is a schematic diagram that illustrates another exemplary embodiment of a system for routing and transmitting USB information, video information encapsulated in USB, and network information encapsulated in USB from a host to multiple devices via a non-USB extension medium according to various aspects of the present disclosure.

FIG. 5B is a schematic diagram that illustrates another exemplary embodiment of a system for routing and transmitting USB information, video information encapsulated in USB, and network information encapsulated in USB from a host to multiple devices via a non-USB extension medium according to various aspects of the present disclosure. The host 502, UFP device 522, and network device 520 illustrated in FIG. 5B are similar to those illustrated in FIG. 5A. What FIG. 5B shows is that the UFP device 522 is capable of routing and transmitting USB information, including video information encapsulated in USB, to more than one DFP device. In the illustrated embodiment, the UFP device 522 is paired with/connected to both a first DFP device 552 and a second DFP device 554 via the non-USB extension medium (which, again, may include network 90). The first DFP device 552 is coupled via USB to device 514 and device 516. The second DFP device 552 includes a video device 518 similar to the video device 518 described above. As discussed further below, the UFP device 522 is configured to route/transmit video information encapsulated in USB to the second DFP device 554, and to route/transmit USB information that does not encapsulate video or network information to the first DFP device 552. One of ordinary skill in the art will understand that this technique could be extended further, and in some embodiments, more than two DFP devices may be paired with/connected to the UFP device 522.

Figure 5C:
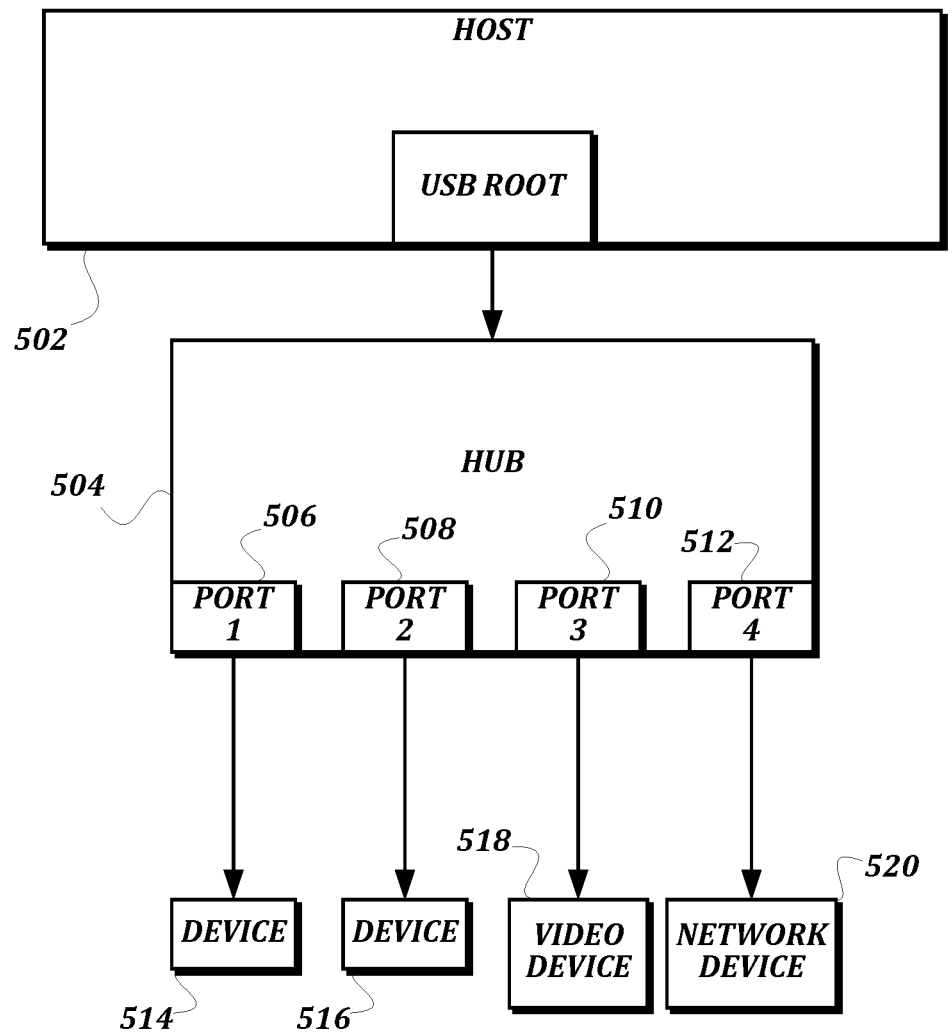
FIG. 5C is a schematic diagram that illustrates an exemplary embodiment of a logical USB network as seen from the USB host controller of the host device according to various aspects of the present disclosure.

FIG. 5C is a schematic diagram that illustrates an exemplary embodiment of a logical USB network as seen from the USB host controller of the host device according to various aspects of the present disclosure. The logical USB network illustrated in FIG. 5C is what the USB network that includes the UFP device 522 and the one or more DFP devices illustrated in either of FIG. 5A or 5B would look like to the host 502. As shown, the host 502 sees a hub 504 coupled to the downstream facing port of the USB root provided by the USB host controller 212. In the actual device topologies illustrated in FIGS. 5A and 5B, the logical hub 504 is illustrated by a broken line box surrounding the UFP device 522 and the one or more DFP devices, but is not embodied in any single physical device. Instead, functionality of the logical hub 504 is split between the UFP device 522 and the one or more DFP devices.

The logical hub 504 includes four logical USB downstream facing ports 506, 508, 510, 512. The first USB downstream facing port 506 and second USB downstream facing port 508 reflect actual USB downstream facing ports of the one or more DFP devices that are connected to the USB devices 514, 516. The third USB downstream facing port 510 is used to communicate with the video device 518, and the fourth USB downstream facing port 512 is used to communicate with the network device 520. In some embodiments, the software executing on the host 502, including but not limited to the USB device drivers 206, may see the video device 518 and the network device 520 as USB devices connected to the third USB downstream facing port 510 and the fourth USB downstream facing port 512 through the USB host controller 212. In some embodiments, the USB host controller 212 may address encapsulated information to the third USB downstream facing port 510 and the fourth USB downstream facing port 512 internally, but may not expose the third USB downstream facing port 510 and the fourth USB downstream facing port 512 to the USB device drivers 206, in which case FIG. 5C would represent the logical USB network as seen by the USB host controller 212 but not the USB device drivers 206.

Figure 6:
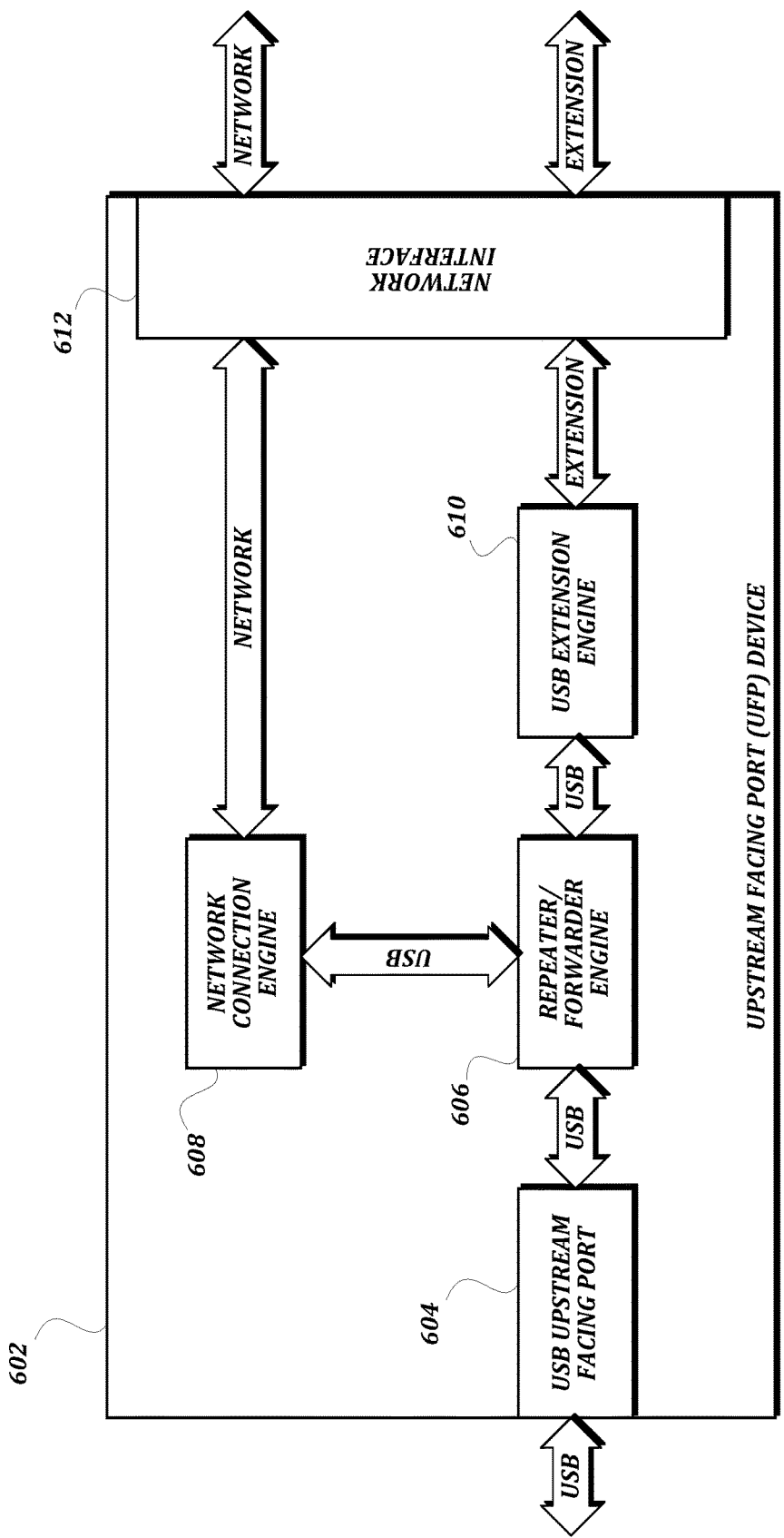
FIG. 6 is a block diagram that illustrates an exemplary embodiment of an upstream facing port device (UFP device) according to various aspects of the present disclosure.

FIG. 6 is a block diagram that illustrates an exemplary embodiment of an upstream facing port device (UFP device) according to various aspects of the present disclosure. The illustrated UFP device 602 is an example of a UFP device 522 illustrated in FIGS. 5A and 5B and discussed above. As shown, the UFP device 602 includes a USB upstream facing port 604, a USB extension engine 610, and a network interface 612. The USB upstream facing port 604 may be any type of USB-compatible port, including a USB Type-C port, a USB 3.0 port, a USB 3.1 port, a USB 2.0 port, a USB 1.1 port, or any other type of USB port, and is configured to receive USB information from host device 202. The network interface 612 is suitable for communicating with a network that includes one or more DFP devices and/or one or more network devices, as discussed above. The USB extension engine 610 is configured to exchange USB information with one or more DFP devices via the non-USB extension medium using various techniques detailed in the patents incorporated above.

Unlike previously disclosed techniques, the UFP device 602 includes a repeater/forwarder engine 606 configured to handle routing of encapsulated video information and/or encapsulated network information along with traditional USB information. Upon receiving an incoming USB packet, the repeater/forwarder engine 606 determines a destination for the USB packet based on the content of the packet. If the USB packet encapsulates network information, then the repeater/forwarder engine 606 routes the USB packet to a first USB destination. If the USB packet encapsulates video information, then the repeater/forwarder engine 606 routes the USB packet to a second USB destination. Otherwise, if the USB packet is intended for a downstream USB device other than a network connection engine 608 or a USB video device emulation engine 708, then the repeater/forwarder engine 606 routes the USB packet to the downstream USB device via the USB extension engine 610. Techniques for determining the destination, as well as details regarding the various types of destinations, are discussed further below.

Figure 7:
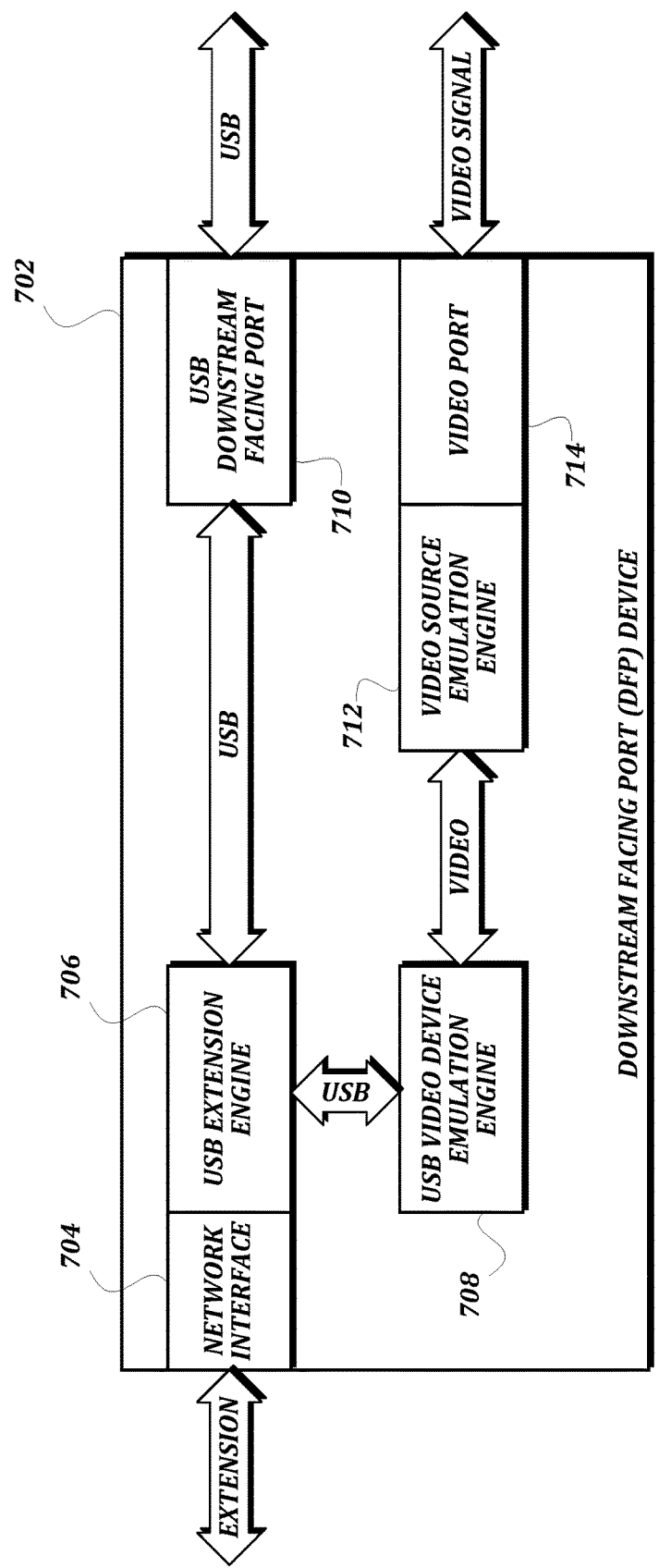
FIG. 7 is a block diagram that illustrates an exemplary embodiment of a downstream facing port device (DFP device) according to various aspects of the present disclosure.

FIG. 7 is a block diagram that illustrates an exemplary embodiment of a downstream facing port device (DFP device) according to various aspects of the present disclosure. The DFP device 702 includes at least one USB downstream facing port 710, a USB extension engine 706, and a network interface 704. The network interface 704 is suitable for communicating with the UFP device 602 via the non-USB extension medium as discussed above. The USB extension engine 706 is configured to exchange USB information with the UFP device 602 via the network interface 704 and the non-USB extension medium and route the USB information to and from one or more USB downstream facing ports 710 using various techniques detailed in the patents incorporated above. The USB extension engine 706 is also configured to provide the video information encapsulated in USB to a USB video device emulation engine 708. Because the USB extension engine 706 is configured to receive information using an extension protocol, in some embodiments, the extension protocol may include an indication of whether a given incoming packet contains encapsulated video information and should be provided by the USB extension engine 706 to the USB video device emulation engine 708. In some embodiments, a characteristic of the USB packet may itself indicate the destination. Further details of techniques for determining the destination, as well as details of the destinations, are discussed further below.

In some embodiments, the first USB destination discussed above with respect to FIG. 6 is a network connection engine 608. In some embodiments, the network connection engine 608 is a USB function provided by the UFP device 602. In some embodiments, the network connection engine 608 may be a USB device such as a network dongle coupled to downstream facing port functionality associated with the repeater/forwarder engine 606. In some embodiments, the network connection engine 608 may be a virtual USB device that is addressable in a way similar to a USB device but that is instead functionality provided by circuitry that is an integral part of the UFP device 602.

In some embodiments, the network connection engine 608 is configured to receive the network information encapsulated in USB from the repeater/forwarder engine 606, extract the network information from the USB packet, and transmit the network information to a network device on the network 90 via the network interface 612. In some embodiments, the network connection engine 608 also receives incoming network information from one or more network devices via the network interface 612, encapsulates the network information in USB packets, and provides them to the repeater/forwarder engine 606 for transmission to the host device 202. Because the network interface 612 may be receiving incoming network packets intended for the USB extension engine 610 and the network connection engine 608 from the same network, in some embodiments the network interface 612 is configured to determine whether incoming network packets include network data or USB extension data and to route the incoming network packets to the USB extension engine 610 or the network connection engine 608 accordingly. For example, in some embodiments this determination may be based on a destination port in the incoming network packets, wherein a first port is associated with the network connection engine 608 and a second port is associated with the USB extension engine 610. As another example, in some embodiments, this determination may be based on a source device address in the incoming network packet, and the network interface 612 can determine that incoming network packets are intended for the USB extension engine 610 if the source device address belongs to a DFP device 702 to which the UFP device 602 is paired. In some embodiments, the network connection engine 608 may be provided by the DFP device 702 instead of the UFP device 602, such as if the network between the UFP device 602 and the DFP device 702 is a point-to-point connection, and the DFP device 702 (but not the UFP device 602) is connected to the network 90 to which the network information is intended.

In some embodiments, the second USB destination discussed above with respect to FIG. 6 is the USB video device emulation engine 708. In some embodiments, the USB video device emulation engine 708 is a USB function provided by the DFP device 702, as illustrated in FIG. 7. In some embodiments, the USB video device emulation engine 708 may be a USB function provided by the UFP device 602, and the video signal or other video information format may be used to transmit the video from the UFP device 602 to the DFP device 702 via the non-USB extension medium. In some embodiments, video encapsulated in USB may be addressed to the USB video device emulation engine 708 in a manner similar to how USB information is addressed to other USB devices connected to the one or more USB downstream facing ports 710 (if located on the DFP device 702), or in a manner similar to how network information is addressed to the network connection engine 608 (if located on the UFP device 602).

In some embodiments, the USB video device emulation engine 708 receives video information encapsulated in USB, extracts the video information, and provides the video information to a video source emulation engine 712. In some embodiments, the video source emulation engine 712 acts as a video source to a video sink coupled to the video port 714, such as a display device. Acting as a video source includes transmitting the video signal, and may also include other actions for configuring the video sink that are related to the particular video signal technology, such as exchanging capabilities, link training, and/or the like. As with the output of the GPU 114, the video source may be any type of video source and the video signal may be any type of video signal, including but not limited to VGA, DVI, HDMI, and DisplayPort. In some embodiments, the video signal produced by the video source emulation engine 712 may be different from a video signal that the GPU 214 is capable of producing. In some embodiments, the USB video device emulation engine 708 may be provided by the UFP device 602 instead of the DFP device 702

As mentioned above, the repeater/forwarder engine 606 of the UFP device 602 is configured to determine a destination for USB packets received from the host device 202 based on the content of the packets. In some embodiments, the repeater/forwarder engine 606 may determine the type of information included in the USB packet (i.e., network information, video information, or other USB information), and uses the type of information to choose a predetermined destination for the USB packet. For example, the DFP device 702 may be addressable using a given network address such as an IP address, a MAC address, and/or the like. The UFP device 602 may be configured by a user at run-time or by a manufacturer upon an initial configuration such that the repeater/forwarder engine 606, upon determining that a USB packet encapsulates video information and should be routed to the second USB destination, transmits the USB packet that encapsulates video information to the DFP device 702 using the given network address regardless of any addressing information or other content in the USB packet. Likewise, the first USB destination may be the network connection engine 608 provided by the UFP device 602, and the repeater/forwarder engine 606 may be configured by the user at run-time or by a manufacturer upon an initial configuration to provide all USB packets that encapsulate network information to the network connection engine 608 regardless of any addressing information or other content in the USB packet. Further details regarding techniques for user configuration of pairings between a UFP device 602 and one or more DFP devices 702 are provided in commonly owned, co-pending U.S. patent application Ser. No. 13/791,579, filed Mar. 8, 2013, the entire disclosure of which is hereby incorporated by reference for all purposes. In some embodiments, the repeater/forwarder engine 606 may determine the type of content in a USB packet by analyzing a payload of the USB packet and inspecting the content. In some embodiments, the repeater/forwarder engine 606 may determine the type of content in a USB packet using an indication of the content type inserted by the USB host controller 212.

In some embodiments, instead of routing the incoming USB packets using the type of information contained therein as described above, a technique that mimics a USB addressing scheme may be used. In such an embodiment, the UFP device 602 and DFP device 702 allow the USB host controller 112 to address USB traffic to each of the USB destinations separately using USB addresses, hub addresses, hub port numbers, endpoints, and/or the like. As used herein, a "USB address" may refer interchangeably to any of a USB address, a hub address, a hub port number, an endpoint number, and combinations thereof. In such an embodiment, the USB host controller 112 may be configured to use USB addresses to direct encapsulated traffic to the first USB destination and the second USB destination, and to direct other USB information to any other USB destination upon the creation of the USB packets.

In some such embodiments that use USB 1.1 or 2.0 transmission and/or addressing techniques, the repeater/forwarder engine 606 may be configured to store a configurable mapping table between USB addresses and network addresses such as MAC addresses, IP addresses, and/or the like. For example, when creating a USB packet that encapsulates network information, the USB host controller 112 addresses the USB packet to a USB address associated with the network connection engine 608. When received by the repeater/forwarder engine 606, the repeater/forwarder engine 606 consults the mapping table and finds that the USB address is associated with a network address of its own device (the UFP device 602). The repeater/forwarder engine 606 then provides the packet to the network connection engine 608 accordingly.

As another example, when creating a USB packet that encapsulates video information, the USB host controller 112 addresses the USB packet to a USB address associated with the USB video device emulation engine 708. When received by the repeater/forwarder engine 606, the repeater/forwarder engine 606 consults the mapping table to find a MAC address associated with the DFP device 702 that is providing the indicated USB address. The repeater/forwarder engine 606 then uses the USB extension engine 610 to transmit the USB packet to the indicated DFP device 702 to be provided to the USB video device emulation engine 708. The mapping table may be similarly used to route USB packets intended for USB devices other than the network connection engine 608 or USB video device emulation engine 708 to one or more DFP devices 702.

In some embodiments that use USB 3.0 or 3.1 transmission and/or addressing techniques, the repeater/forwarder engine 606 may be configured to route information using a route string added to the USB packet by the USB host controller 212. In such embodiments, each of the USB destinations may be indicated by a different port number which can be specified in the route string. The repeater/forwarder engine 606 may store a mapping table that associates network addresses such as MAC addresses, IP addresses, and/or the like used to address the UFP device 602 and/or one or more DFP devices 702 with the port numbers. Because USB functions made available by or attached to the UFP device 602 and the one or more DFP devices 702 appear to the USB host controller 212 to be connected to a single hub, in some embodiments all of the port numbers may be specified at the same hub level in the route string, even if the USB functions are provided by different UFP devices 602 or DFP devices 702.

Figure 8B:
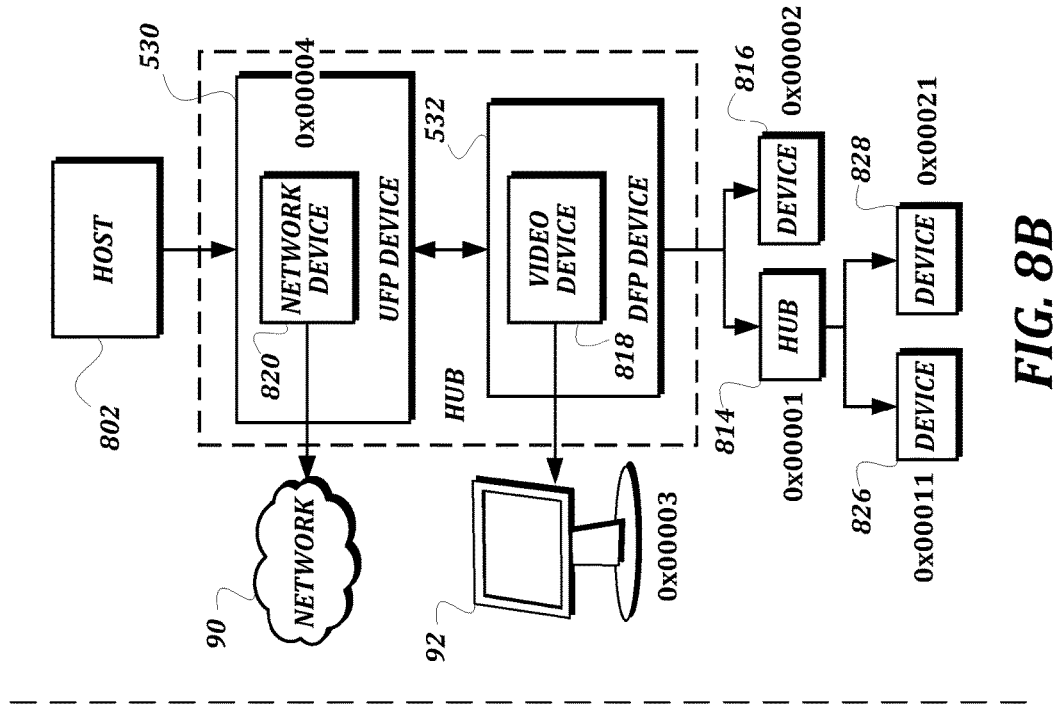
FIG. 8B is a schematic diagram that illustrates an exemplary embodiment of a device topology that supports the logical USB network illustrated in FIG. 8A according to various aspects of the present disclosure.
Figure 8A:
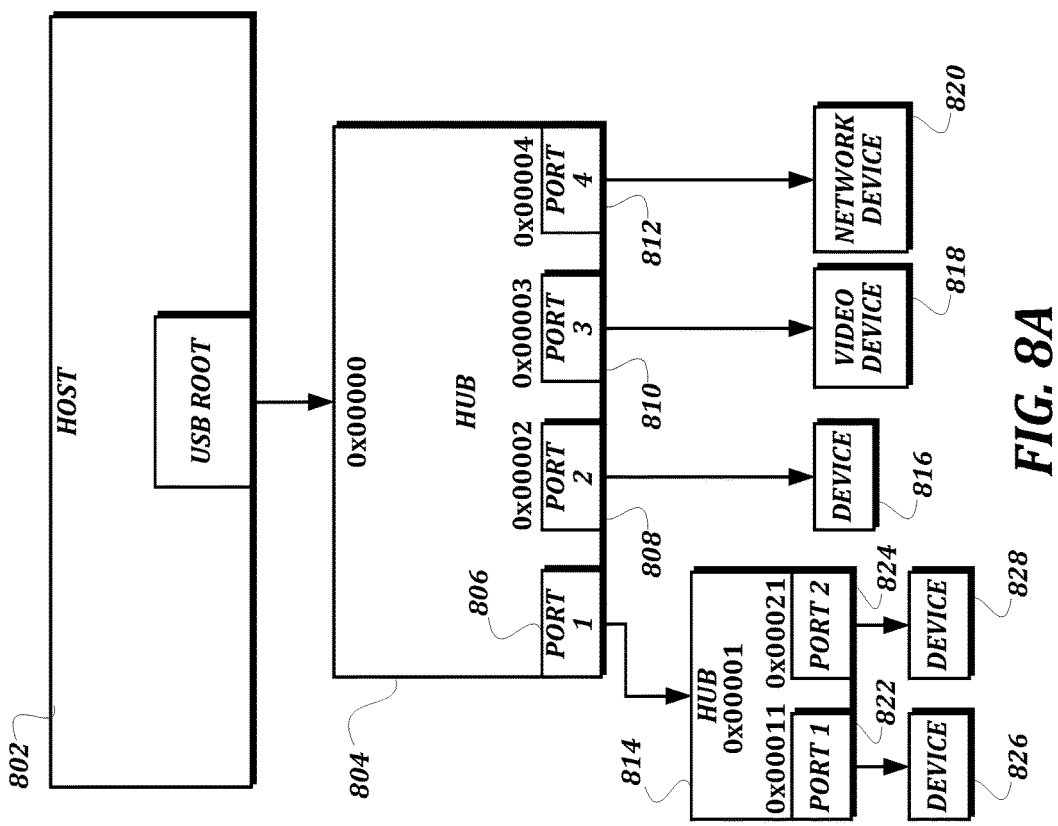
FIG. 8A is a schematic diagram that illustrates a logical USB 3.0 network as seen from the USB host controller of the host device according to various aspects of the present disclosure.

To further explain such an embodiment that uses route strings to address USB packets, FIG. 8A is a schematic diagram that illustrates a logical USB 3.0 network as seen from the USB host controller of the host device according to various aspects of the present disclosure. The logical hub 804 includes four logical USB downstream facing ports 806, 808, 810, and 812. The first USB downstream facing port 806 reflects an actual USB downstream facing port of a DFP device that is connected to an upstream facing port of a USB hub 814. The USB hub 814, in turn, has a first USB downstream facing port 822 and a second USB downstream facing port 824, which are connected to USB devices 826 and 828, respectively. The second USB downstream facing port 808 reflects an actual USB downstream facing port of a DFP device connected to the USB devices 816. The third USB downstream facing port 810 is used to communicate with the video device 818, and the fourth USB downstream facing port 812 is used to communicate with the network device 820. The logical topology of FIG. 8A is similar to that illustrated and described in FIG. 5C, though an additional hub 814 is illustrated as connected to the first downstream facing port 806 of the hub 804 for the purposes of discussion.

Using USB 3.0-style route string addressing, each port in the system is identified by a route string that can be represented as a five-digit hexadecimal number. Each digit in the number indicates a different hub level, and the value "zero" at a given hub level is reserved for the upstream facing port of the hub. Accordingly, the upstream facing port of the logical hub 804 is addressed by the route string "0x00000" and the downstream facing ports 806, 808, 810, and 812 are addressed by the route strings "0x00001", "0x00002", "0x00003", and "0x00004", respectively. Each of the devices, such as the device 816, the video device 818, and the network device 820, may be addressed using the route string of the downstream facing port to which it is connected. The upstream facing port of the hub 814 is coupled to the first downstream facing port 806 of the logical hub 804, and so may be addressed using the route string "0x00001". The downstream facing ports 822, 824 of the hub 814 are at the next hub level, and so may be addressed using the route strings "0x00011" and "0x00021", respectively, and the USB devices 826 and 828 may be addressed using the route strings of the associated ports.

FIG. 8B is a schematic diagram that illustrates an exemplary embodiment of a device topology that supports the logical USB network illustrated in FIG. 8A according to various aspects of the present disclosure. The device topology of FIG. 8B is similar to that illustrated in FIG. 5A, but with route strings displayed and the addition of the hub 814. This does not imply that the systems illustrated in FIG. 5B and/or FIG. 5C do not use route strings, but FIG. 8B is provided as a separate figure for clarity of discussion. As shown, the fourth port of the logical hub (route string "0x00004") to which the network device 820 is logically attached is provided by the UFP device 530, and the third port of the logical hub (route string "0x00003") to which the video device 818 is logically attached is provided by the DFP device 532. The USB host controller 212 on the host 802 would add the route string "0x00004" to USB packets that encapsulate network information, would add the route string "0x00003" to USB packets that encapsulate video information, and so on. The USB packets would then be routed appropriately by the repeater/forwarder engine 606 based on the route strings as described above.

Because the route strings are used by the repeater/forwarder engine 606 to determine when USB information should be transmitted via the non-USB extension medium to the DFP device 532, ports at the same level in the route string may be provided by separate physical devices across the non-USB extension medium. Even after crossing the extension medium, the hub depth is the same. This is distinguishable from route strings as described in the USB 3.0 specification, at least because the USB 3.0 specification would not allow a non-USB extension medium to fall in the middle of components of a hub device, nor would it allow ports from a given hub to be split among multiple devices (as in FIG. 5C).

In general, the term "engine" as used herein refers to logic embodied in hardware or software instructions, which can be written in a programming language, such as C, C++, COBOL, JAVA™, PHP, Perl, HTML, CSS, JavaScript, VBScript, ASPX, Microsoft .NET™ languages such as C#, and/or the like. An engine may be compiled into executable programs or written in interpreted programming languages. Engines may be callable from other engines or from themselves. Generally, the engines described herein refer to logical modules that can be merged with other engines or applications, or can be divided into sub-engines. The engines can be stored in any type of computer readable medium or computer storage device and be stored on and executed by one or more general purpose computers, thus creating a special purpose computer configured to provide the engine. In some embodiments, one or more of the engines described herein may be implemented within a logic device such as a PLD, an ASIC, a FPGA, and/or the like. In some embodiments, one or more of the engines described herein may be implemented using a dedicated digital hardware device implemented, for example, as a state machine configured to perform the actions described herein; within an application specific processor; and/or within any other suitable computing device.

While illustrative embodiments have been illustrated and described, it will be appreciated that various changes can be made therein without departing from the spirit and scope of the invention. For example, the above description relates primarily to the encapsulation of video information and/or network information over USB along with USB information. However, in some embodiments, similar techniques for the extension and routing of USB 3.0 and/or 3.1 information may be used for network information, USB information, or video information alone. As another example, even though a single host is illustrated and described in each system, this does not limit embodiments of the present disclosure to a single host or UFP device on a network 90. In some embodiments, multiple hosts 302 multiple UFP devices 304, and multiple DFP devices 306 may be present on the same network 90. As another example, in some embodiments the transmission of video information and/or network information via USB may be performed over a USB-compatible communication link between a host device and one or more USB devices that consume the video information and/or the network information without being transmitted over a non-USB extension medium by a UFP device and a DFP device. In such an embodiment, the USB network is used in a traditional manner to route the USB packets to various endpoints within the USB network. As still another example, one of ordinary skill in the art will recognize that, although USB 3.0/3.1 and USB 2.0/1.1/1.0 were discussed separately above, in some embodiments, USB 3.0/3.1 and USB 2.0/1.1/1.0 are concurrently supported by the UFP device and the DFP devices. In such embodiments, some USB traffic may be transmitted via SuperSpeed techniques and other information may be transmitted via USB 2.0/1.1/1.0 techniques, and the USB technique used may provide further basis for the routing of the information by the repeater forwarder engine 606.

The embodiments of the invention in which an exclusive property or privilege is claimed are defined as follows:

1. A system for communication of at least USB information and video information via an extension medium, the system comprising:
   a host computing device that includes
      a USB host controller;
   an upstream facing port device (UFP device) configured to be coupled to the host computing device via USB, wherein the UFP device includes a network connection engine configured to receive encapsulated network data, extract network data from the encapsulated network data, and transmit the network data via a network; and
   a downstream facing port device (DFP device) configured to be coupled to the UFP device via an extension medium, wherein the DFP device includes:
      a video device emulation engine configured to receive USB information and extract video information encapsulated therein; and
      a video source emulation engine configured to receive the extracted video information and to transmit an output video signal to a video sink;
   wherein the USB host controller is configured to:
      transmit video data encapsulated in USB to the DFP device via the UFP device and the extension medium, and address the video data encapsulated in USB to the video device emulation engine using a first route string; and
      transmit network data encapsulated in USB for transmission to the UFP device, and address the network data encapsulated in USB to the network connection engine using a second route string.

2. The system of claim 1, wherein the host computing device includes:
a graphics processing unit (GPU);
wherein the USB host controller is configured to:
receive video data directly from a frame buffer of the GPU; and
encapsulate the video data in USB.

3. The system of claim 1, wherein the host computing device includes:
a network interface controller (NIC);
wherein the USB host controller is configured to:
receive network data directly from a buffer of the NIC; and
encapsulate the network data in USB.

4. The system of claim 1, wherein a port of the video device emulation engine in the first route string and a port of the network connection engine in the second route string are at the same hub level.

5. The system of claim 1, wherein the output video signal is selected from the group consisting of a DisplayPort signal, an HDMI signal, a VGA signal, and a DVI signal.

6. An upstream facing port device (UFP device), comprising:
a USB upstream facing port;
a USB function;
a network interface; and
a repeater/forwarder engine configured to:
receive a USB packet via the USB upstream facing port;
in response to determining that the USB packet includes a route string that indicates that the USB packet is intended for the USB function, provide the USB packet to the USB function; and
in response to determining that the USB packet includes a route string that indicates that the USB packet is intended for a remote USB function accessible via a downstream facing port device (DFP device), transmit the USB packet to the DFP device via the network interface;
wherein the route string that indicates that the USB packet is intended for the USB function is a first route string, and wherein the route string that indicates that the USB packet is intended for a remote USB function accessible via a DFP device is a second route string different from the first route string.

7. The UFP device of claim 6, wherein the USB function includes a network connection engine configured to:
receive the USB packet from the repeater/forwarder engine;
extract a network packet from the USB packet; and
transmit the network packet via the network interface.

8. The UFP device of claim 7, wherein the network connection engine is further configured to:
receive a network packet from the network interface;
encapsulate the network packet in a second USB packet having a route string that indicates that the second USB packet is intended for a host; and
provide the second USB packet to the repeater/forwarder engine.

9. The UFP device of claim 6, wherein transmitting the USB packet to the DFP device via the network interface comprises determining a network address of the DFP device based on the route string.

10. The UFP device of claim 6, wherein a port of the USB function indicated by the first route string and a port of the remote USB function indicated by the second route string are at the same hub level.

11. The UFP device of claim 6, wherein the remote USB function is a video device emulation engine.

12. The UFP device of claim 6, wherein the remote USB function is a USB hub or a USB device.

13. A method, comprising:
receiving, by a UFP device from a host, a USB packet via a USB upstream facing port;
determining, by the UFP device, a destination for information carried by the USB packet based on a route string in the USB packet;
providing, by the UFP device, the USB packet to a local USB function in response to determining that the route string is a first route string associated with the local USB function; and
providing, by the UFP device, the USB packet to a downstream facing port device (DFP device) via a network interface in response to determining that the route string is a second route string that is different from the first route string and is associated with a remote USB function provided by the DFP device.

14. The method of claim 13, further comprising:
receiving, by the local USB function, the USB packet;
extracting, by the local USB function, a network packet from the USB packet; and
transmitting, by the local USB function, the network packet via the network interface.

15. The method of claim 14, further comprising:
receiving, by the UFP device via the network interface, an incoming network packet;
determining, by the UFP device, whether the incoming network packet includes network data or USB extension data;
in response to determining that the incoming network packet includes network data, providing the incoming network packet to the local USB function; and
in response to determining that the incoming network packet includes USB extension data, providing the incoming network packet to a USB extension engine.

16. The method of claim 15, wherein the determination of whether the incoming network packet includes network data or USB data is based on a destination port in the incoming network packet.

17. The method of claim 15, wherein the determination of whether the incoming network packet includes network data or USB data is based on a source device address in the incoming network packet.

18. The method of claim 13, wherein providing the USB packet to a downstream facing port device (DFP device) via a network interface further comprises:
providing the USB packet to a first DFP device via the network interface in response to determining that the second route string is associated with a first remote USB function provided by the first DFP device; and
providing the USB packet to a second DFP device via the network interface in response to determining that the second route string is associated with a second remote USB function provided by the second DFP device.

* * * * *